(12) United States Patent
Lee et al.

(10) Patent No.: US 8,823,902 B2
(45) Date of Patent: Sep. 2, 2014

(54) LIQUID CRYSTAL DISPLAY DEVICE

(75) Inventors: Dal-Jae Lee, Seoul (KR); Hyo-Jin Kim, Gyeongsangbuk-do (KR); Hark-Myung Lee, Daegu (KR); Sung-Il Byun, Seoul (KR)

(73) Assignee: LG Display Co., Ltd., Seoul (KR)

( * ) Notice: Subject to any disclaimer, the term of this patent is extended or adjusted under 35 U.S.C. 154(b) by 195 days.

(21) Appl. No.: 13/339,229

(22) Filed: Dec. 28, 2011

(65) Prior Publication Data

US 2012/0314153 A1 Dec. 13, 2012

(30) Foreign Application Priority Data

Jun. 9, 2011 (KR) .................. 10-2011-0055761

(51) Int. Cl.
*G02F 1/1335* (2006.01)

(52) U.S. Cl.
CPC ............ *G02B 6/0068* (2013.01); *G02B 6/0073* (2013.01); *G02B 6/0091* (2013.01); *G02F 2001/133613* (2013.01); *G02F 1/133603* (2013.01); *G02F 1/133615* (2013.01)
USPC ............ 349/65; 362/600; 362/617; 362/612; 349/61; 349/58; 349/62

(58) Field of Classification Search
CPC .................................................. G02F 1/1333
USPC .......... 349/65, 61, 58, 62; 362/600, 617, 612, 362/615, 555
See application file for complete search history.

(56) References Cited

U.S. PATENT DOCUMENTS

| | | | |
|---|---|---|---|
| 2008/0310153 A1* | 12/2008 | Hamada et al. | 362/231 |
| 2011/0109844 A1* | 5/2011 | Go et al. | 349/65 |
| 2011/0122337 A1* | 5/2011 | Shimizu et al. | 349/61 |
| 2012/0170310 A1* | 7/2012 | Bita et al. | 362/606 |
| 2012/0188465 A1* | 7/2012 | Ohyama | 348/739 |
| 2012/0212676 A1* | 8/2012 | Kuromizu | 348/725 |
| 2012/0224106 A1* | 9/2012 | Kosaka et al. | 348/725 |
| 2013/0148056 A1* | 6/2013 | Hineno et al. | 349/62 |
| 2013/0201723 A1* | 8/2013 | Gourlay | 362/613 |

FOREIGN PATENT DOCUMENTS

JP 2009-294346 * 12/2009 ............. G09F 9/00

* cited by examiner

*Primary Examiner* — Edward Glick
*Assistant Examiner* — Sang V Nguyen
(74) *Attorney, Agent, or Firm* — Birch, Stewart, Kolasch & Birch, LLP

(57) ABSTRACT

A liquid crystal display device includes a liquid crystal panel including a display region and first to fourth non-display regions surrounding the display region; a light guide plate below the liquid crystal panel; and first and second LED assemblies facing opposite sides of the light guide plate and corresponding to the first and second non-display regions, respectively, that have different first and second widths, respectively, wherein the first LED assembly includes a plurality of first LED packages arranged at a first distance, and the second LED assembly includes a plurality of second LED packages arranged at a second distance.

7 Claims, 5 Drawing Sheets

LIQUID CRYSTAL DISPLAY DEVICE

The present application claims the benefit of Korean Patent Application No. 10-2011-0055761, filed in Korea on Jun. 9, 2011, which is hereby incorporated by reference for all purposes as if fully set forth herein.

BACKGROUND OF THE INVENTION

1. Field of the Invention

The present invention relates to a liquid crystal display device.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

The LCD device requires a backlight unit to supply light to a liquid crystal panel. The backlight unit is categorized into a direct type and an edge type. The edge type backlight unit has a configuration that a light source is arranged at one or more side of a light guide plate while the direct type backlight unit has a configuration that a light source is arranged below a liquid crystal panel.

The edge type backlight unit has an advantage of thin profile compared to the direct type. Recently, light emitting diodes (LEDs) are widely used as light sources of a backlight unit because the LEDs have advantages of small size, low power consumption, and high reliability.

FIG. 1 is a cross-sectional view illustrating an LCD device including an edge type backlight unit using an LED according to the related art, and FIG. 2 is a schematic plan view illustrating the LCD device according to the related art.

Referring to FIG. 1, the LCD device includes a liquid crystal panel 10, a backlight unit 20, a main supporter 30, a bottom case 50, and a top case 40.

The liquid crystal panel 10 includes first and second substrates 12 and 14, and a liquid crystal layer therebetween. Polarizing plates are attached on a top surface of the second substrate 14 and a bottom surface of the first substrate 12.

The backlight unit 20 is below the liquid crystal panel 10. The backlight unit 20 includes a light guide plate 23, an LED package 29 along a side of the light guide plate 23, a reflecting sheet 25 below the light guide plate 23, and at least one optical sheet 21.

The liquid crystal panel 10 and the backlight unit 20 are assembled along with the main supporter 30 surrounding sides thereof, the top case 40 covering top peripheral portions of the liquid crystal panel 10, and the bottom case 30 covering a bottom of the backlight unit 20.

The LED package 29 includes a LED printed circuit board (PCB) 29b, and a plurality of LED chips 29a mounted on the LED PCB 29b along a length direction of the LED PCB 29b.

The LED package 29 is fixed in position through a adhesive and the like so that lights emitted from the LED chips 29a are incident on a light entering surface of the light guide plate 23.

Accordingly, the light from the LED chip 29a is incident on the light entering surface, then is refracted in the light guide plate 23 and goes out upward, then passes through the optical sheet 21 along with a light reflected by the reflecting sheet 25 and is thus converted into a high-quality plane light, and then is supplied to the liquid crystal panel 10.

In the above-described LCD device, the LED PCB 29b is located only at a side where a driving circuit is located, as shown in FIG. 2. This configuration does not meet the needs of high brightness, 400 nit or more.

Further, the LED package 29 requires a predetermined light diffusion distance. Accordingly, in the case of less than the predetermined light diffusion distance, hot spots that bright and dart portions alternate occurs in a display region at a side where the LED backlight unit is located.

SUMMARY OF THE INVENTION

Accordingly, the present invention is directed to a liquid crystal display device which substantially obviates one or more of the problems due to limitations and disadvantages of the related art.

An advantage of the present invention is to provide a liquid crystal display device that can increase brightness and minimize hot spots.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a liquid crystal display device includes a liquid crystal panel including a display region and first to fourth non-display regions surrounding the display region; a light guide plate below the liquid crystal panel; and first and second LED assemblies facing opposite sides of the light guide plate and corresponding to the first and second non-display regions, respectively, that have different first and second widths, respectively, wherein the first LED assembly includes a plurality of first LED packages arranged at a first distance, and the second LED assembly includes a plurality of second LED packages arranged at a second distance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
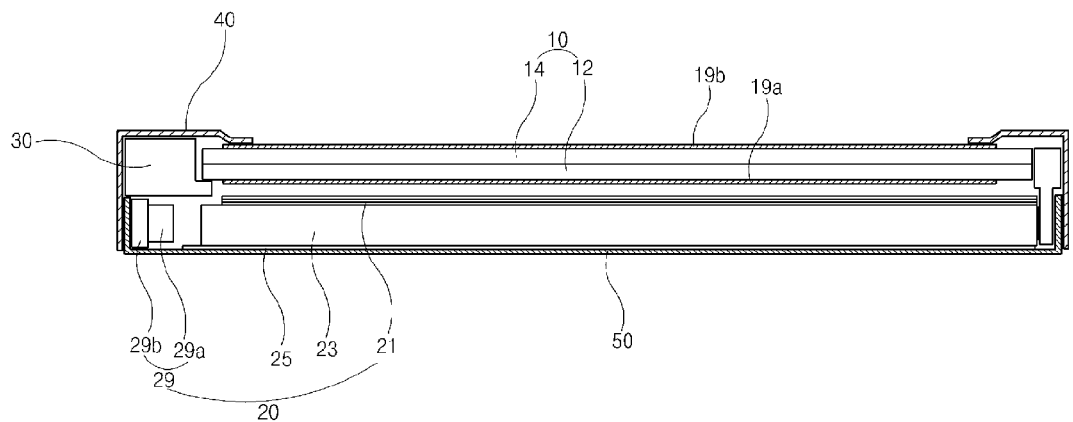
FIG. 1 is a cross-sectional view illustrating an LCD device including an edge type backlight unit using an LED according to the related art.
Figure 2:
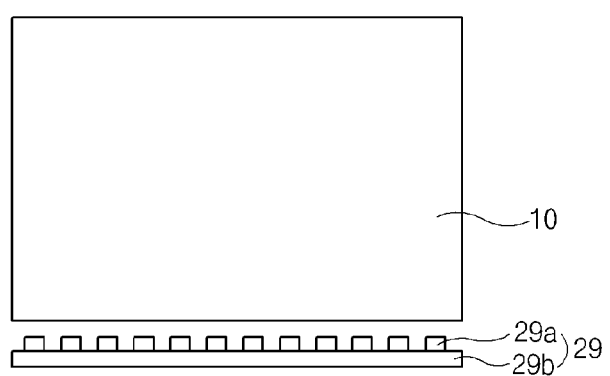
FIG. 2 is a schematic plan view illustrating the LCD device according to the related art.
Figure 3:
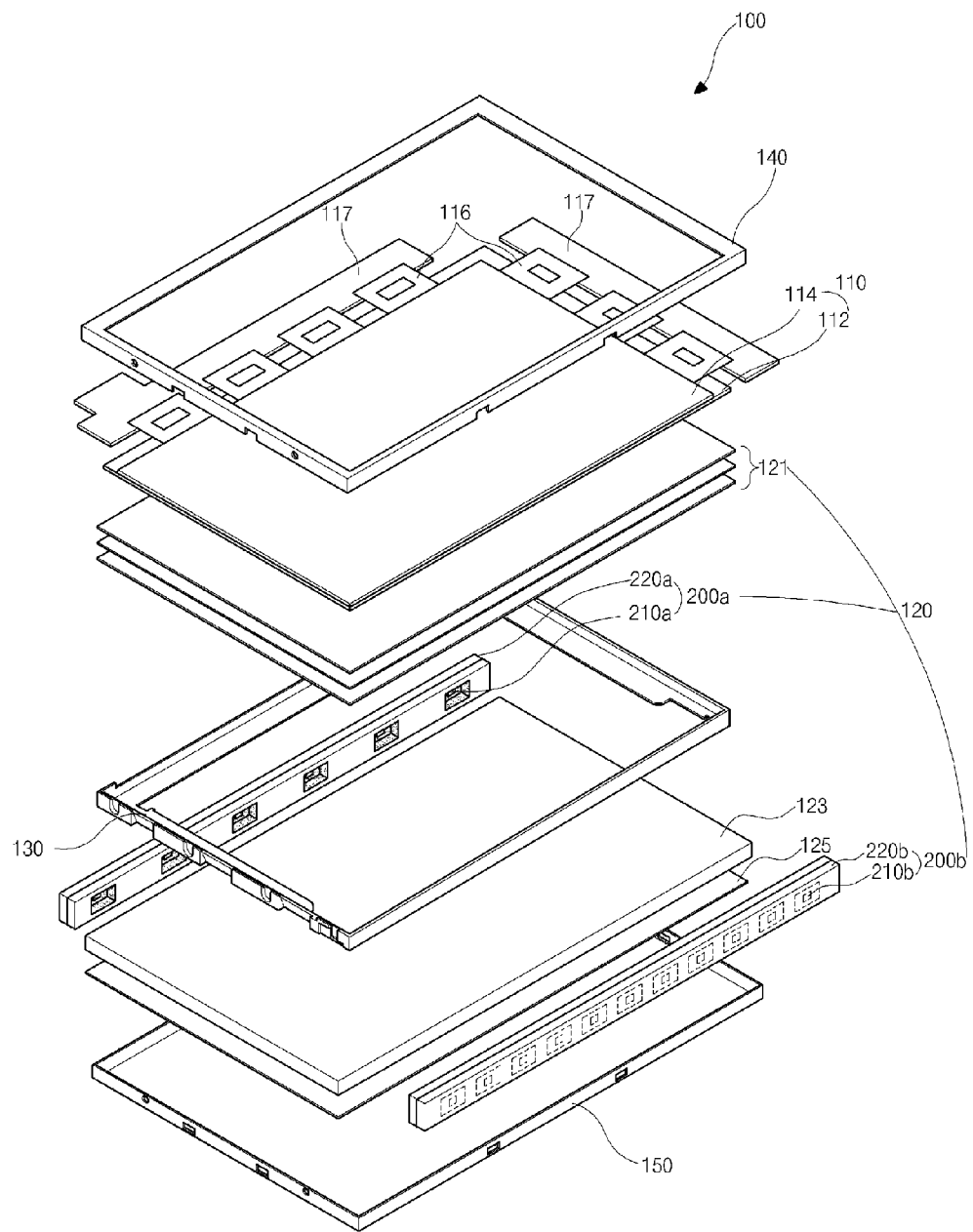
FIG. 3 is a schematic perspective view illustrating an LCD device according to an embodiment of the present invention.
Figure 4:
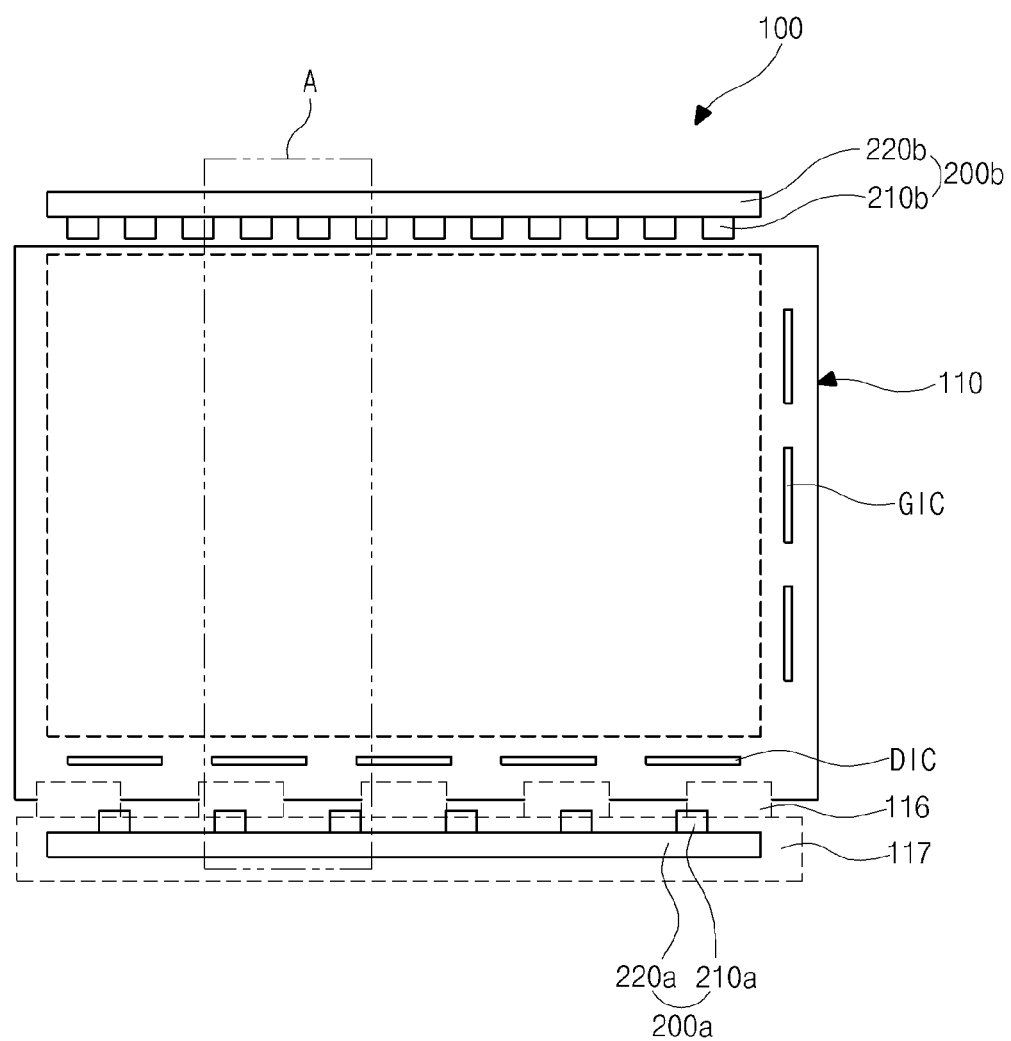
FIG. 4 is a schematic plan view illustrating the LCD device according to the embodiment of the present invention.

FIG. 3 is a schematic perspective view illustrating an LCD device according to an embodiment of the present invention, and FIG. 4 is a schematic plan view illustrating the LCD device according to the embodiment of the present invention. For the purposes of explanation, FIG. 4 shows a liquid crystal panel and a backlight unit.

Referring to FIGS. 3 and 4, the LCD device 100 includes a liquid crystal panel 110, a backlight unit 120, a top case 140, a main supporter 130, and a bottom case 150.

The liquid crystal panel 110 is a component to display images, and includes first and second substrates 112 and 114 and a liquid crystal layer therebetween.

The first substrate 112 is referred to as an array substrate, and includes gate and data lines crossing each other to define a pixel, a thin film transistor in the pixel and connected to the gate and data lines, and a transparent pixel electrode in the pixel and connected to the thin film transistor.

The second substrate 114 is referred to as an opposing substrate or color filter substrate, and includes red, green and blue color filters corresponding to the respective pixel, a black matrix corresponding to the gate and data lines and the thin film transistor, and a common electrode corresponding to the pixel electrode.

Although not shown in the drawings, polarizing plates are attached on outer surfaces of the first and second substrates 112 and 114.

A printed circuit board (PCB) 117 is connected to at least one side of the liquid crystal panel 110 through a connecting film 116 such as a flexible printed circuit board (FPCB) or tape carrier package (TCP). The PCB 117 is located on a side of the main supporter 130 or on a bottom of the bottom case 150 in assembling.

The thin film transistor is turned on when a gate signal is applied thereto, and a data signal applied to the data line passes through the tuned-on thin film transistor and then is applied to the pixel electrode. Accordingly, an electric field is induced between the pixel and common electrodes and operates a liquid crystal layer.

A backlight unit 120 is located below the liquid crystal panel 110 and supplies light to the liquid crystal panel 110.

The backlight unit 120 includes a reflecting sheet 125 that has a white or silver color, a light guide plate 123 on the reflecting sheet 125, first and second LED assemblies 200a and 200b that are located at both opposing sides, respectively of the light guide plate 123, and at least one optical sheet 121 on the light guide plate 123.

The LED assemblies 200a and 200b face the respective side surfaces of the light guide plate 123. The first LED assembly 200a includes a first LED PCB 220a and a plurality of first LED packages 210a that are mounted on the first LED PCB 220a and arranged at a first distance along a length direction of the first LED PCB 220a. The second LED assembly 200b includes a second LED PCB 220b and a plurality of second LED packages 210b that are mounted on the second LED PCB 220b and arranged at a second distance along a length direction of the second LED PCB 220b.

The reflecting sheet 125 is located below the light guide plate 123 and functions to reflect light passing through a bottom surface of the light guide plate 123 toward the liquid crystal panel 110 and increase brightness.

The at least one optical sheet 121 may include a diffusion sheet and at least one prism sheet. The at least one optical sheet 121 functions to diffuse and/or concentrate light and supply a more uniform plane light to the liquid crystal panel 110.

The liquid crystal panel 110 and the backlight unit 120 are assembled along with the top case 140, the main supporter 130 and the bottom case 150. The top case 140 may has a bent frame shape and an opening in its front such that it cover side surfaces of and top peripheral surfaces of the liquid crystal panel 110.

The bottom case 150 is a component that the liquid crystal panel 110 and the backlight unit 120 are placed on. The bottom case 150 has a plane portion and a side portion that are bent upward at sides of the plane portion.

The main supporter 130 has a frame shape that surrounds sides of the liquid crystal panel 110 and the backlight unit 120.

The top case 140, the bottom case 150 and the main supporter 130 are coupled to fix the liquid crystal panel 110 and the backlight unit 120.

As described above, the first and second LED assemblies 200a and 200b at the both sides of the light guide plate 123 are employed, and high brightness can be achieved compared to the related art using the LED assembly at only one side.

The first and second LED assemblies 200a and 200b are explained in more detail as follows.

Figure 5:
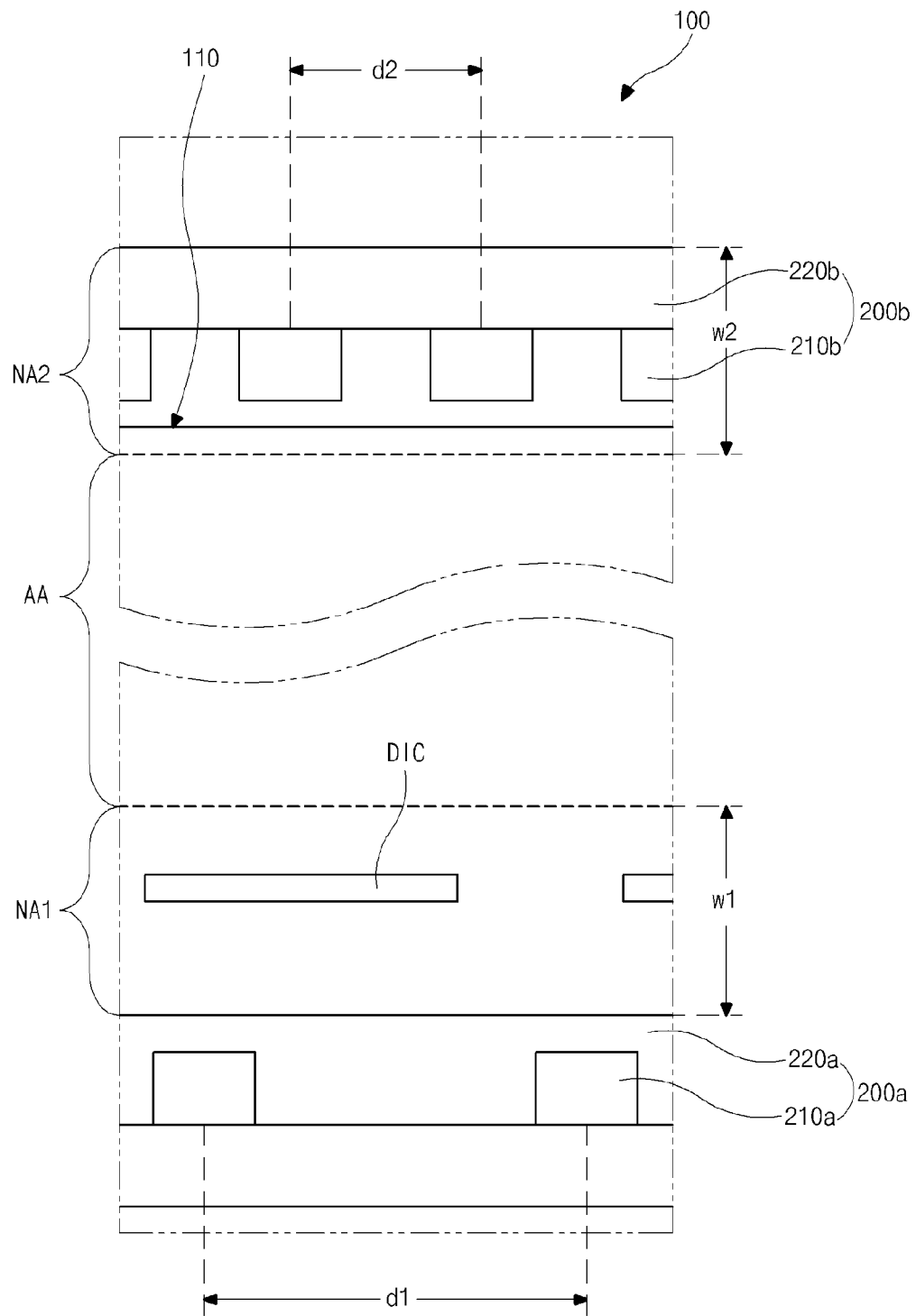
FIG. 5 is a view enlarging an area A of FIG. 4.

FIG. 5 is a view enlarging an area A of FIG. 4.

Referring to FIGS. 3 to 5, the liquid crystal panel 110 includes a display region AA that display images, and non-display regions NA1 and NA2 surrounding the display region AA. The first and second non-display regions may have different widths.

The first non-display region NA1, which a data driving IC DIC are mounted on and is connected to the PCB 117, has a first width w1 while the second non-display region NA2, which the driving IC DIC is not mounted, has a second width w2 less than the first width w1.

In the embodiment, the first LED assembly 200a is located at a side of the first non-display region NA1 while the second LED assembly 200b is located at a side of the second non-display region NA2.

In this case, the first LED packages 210a of the first LED assembly 200a are arranged at a first distance d1 while the second LED packages 210b of the second LED assembly 200b are arranged at a second distance d2 less than the first distance d1.

The reason for making the first and second LED packages 210a and 210b at the different distances d1 and 2 is because of preventing hot spot defects from occurring in the display region AA and achieving a narrow bezel.

A light emitted from an LED package is generally spread at some angle and moves. Due to this spreading angle, an overlap region between spread lights from neighboring LED packages occurs. Further, a non-overlap region, where spread lights from neighboring LED packages do not overlap and no lights thus exist substantially, occurs. In other words, the non-overlap region is defined by opposing outermost lights from neighboring LED packages and has a triangular shape. The overlap region and the non-overlap region are varied according to a distance between LED packages, and the non-overlap region looks dark. Accordingly, a dark portion, which corresponds to the non-overlap region, and a bright portion alternate along an arrangement direction of LED packages. The dark portion i.e., the non-overlap region increases in area and width when a distance between LED packages increases, and it decreases in area and width when a distance between LED packages decreases. This width means a height of the triangular non-overlap region in a direction perpendicular to a front surface of a LED package, and it may be referred to as a light diffusion distance. When the light diffusion distance exists in a display region i.e., the non-overlap region exists in the display region, alternating bright and dark portions are seen and hot spot defects occur.

Accordingly, to prevent hot spot defects caused by using LED packages and achieve a narrow bezel, the first and second LED packages 210a and 210b are arranged at the different distances in consideration of the respective non-display regions NA1 and NA2.

The first non-display region NA1, which the data driving IC DIC is mounted on or the data PCB 117 is connected to through the connecting film 116, and a third non-display region, which a gate driving IC GIC is mounted on or is connected to a gate PCB through a connecting film, have widths greater than those of the second non-display region NA2 and a fourth non-display region, respectively. The fourth non-display region is located opposite to the second non-display region with the display region AA therebetween. Accordingly, when an LED assembly is located near the first non-display region NA1 or the third non-display region, a relatively greater light diffusion distance can be achieved.

Accordingly, the first LED assembly 200a, which includes the first LED packages 210a arranged at the first distance d1, is placed near the first non-display region NA1 or the third non-display region while the second LED assembly 200b, which includes the second LED packages 210b arranged at the second distance d2 less than the first distance d1, is placed near the second non-display region NA2 or the fourth non-display region. For the purposes of explanation, this embodiment shows that the first and second LED assemblies 200a and 200b are placed near the first and second non-display regions NA1 and NA2, respectively.

In this embodiment, when a width of the non-display region NA1 or NA2 corresponding to the LED package 210a or 210b is "W", and a distance between the LED packages 210a or 210b is "D", the LED package 210a or 210b is configured to meet an expression, "W/D≥0.5". In this case, the "D" is greater than a width of the LED package 210a or 210b that is along an arrangement direction of the LED packages 210a or 210b.

For example, when the first and second non-display regions NA1 and NA2 have first and second widths w1 and w2, respectively, and the first and second LED packages 210a and 210b are arranged at first and second distances d1 and d2, respectively, the first LED packages 210a are configured to meet an expression, "w1/d1≥0.5", and the second LED packages 210b are configured to meet an expression, "w2/d2≥0.5".

Widths of non-display regions can be obtained in advance. Accordingly, the first LED assembly 200a can be configured such that the first LED packages 210a are arranged at the first distance d1 that meets an expression, "d1≤2*w1", and the second LED assembly 200b can be configured such that the second LED packages 210b are arranged at the second distance d2 that meets an expression, "d2≤2*w2". According to this configuration, the LCD device 100 can have a high brightness of 400 nit or more without hot spot defects.

In the configuration, a number of the second LED packages 210b is greater than that of the first LED packages 210a.

Figure 6:
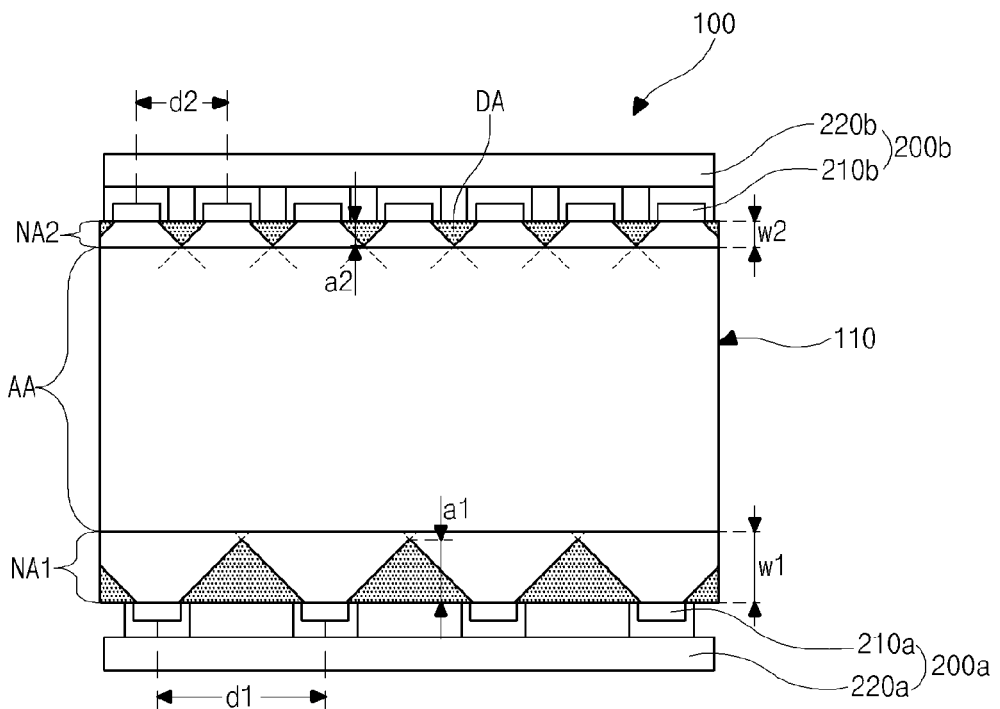
FIGS. 6 and 7 are schematic plan views illustrating regions, where hot spots occur, in LCD devices according to the embodiment of the present invention and a comparative example, respectively.
Figure 7:
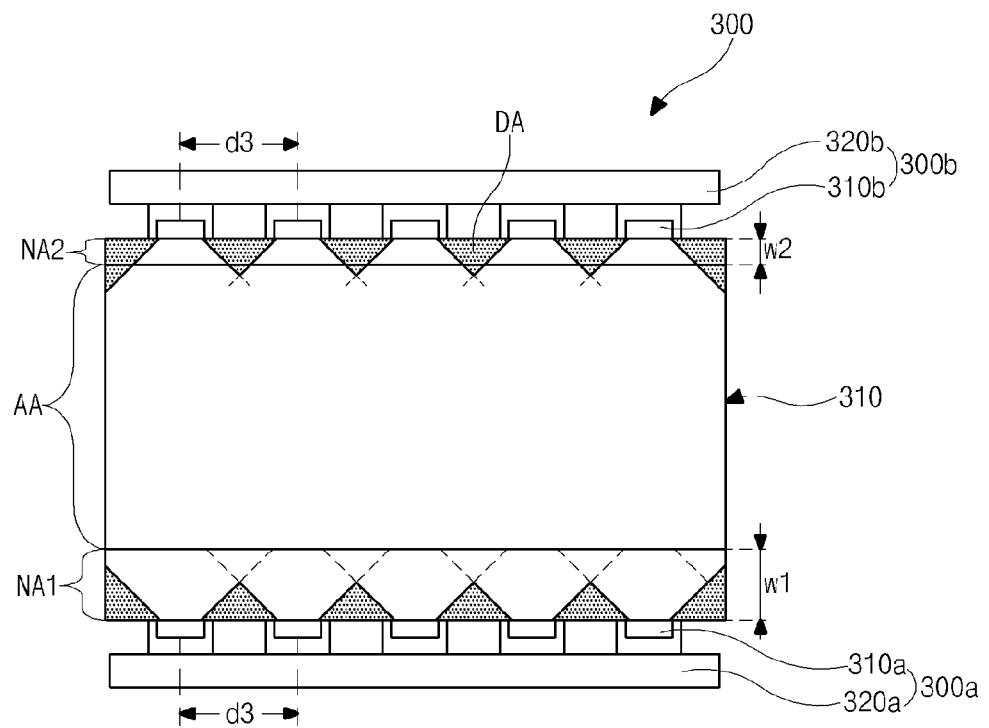

FIGS. 6 and 7 are schematic plan views illustrating regions, where hot spots occur, in LCD devices according to the embodiment of the present invention and a comparative example, respectively.

Referring to FIG. 6, in the LCD device 100 of the embodiment, considering the widths w1 and w2 of the first and second non-display regions NA1 and N2, the first and second LED packages 210a and 210b are arranged at the first and second distances d1 and d2 such that the relationship of a width w of non-display region/a distance d between LED packages meets "w/d≥0.5". Accordingly, light diffusion distances for the first and second LED packages 210a and 210b are less than the first and second widths w1 and w2, respectively. Accordingly, as shown in FIG. 6, a non-overlap region that is dark exists only in the non-display regions NA1 and NA2 and it does not exist in the display region AA. Therefore, hot spots cannot be seen by a viewer.

Further, a number of the LED packages 210a and 210b can be adjusted to an extent that achieves a required brightness without hot spots, and production cost can thus be reduced. Further, the width of the non-display regions NA1 and NA2 can be adjusted considering the distances of the first and second LED packages 210a and 210b, and a narrow bezel can thus be achieved.

Referring to FIG. 7, in the comparative LCD device 300, without considering the widths w1 and w2 of the non-display regions NA1 and NA2, third and fourth LED packages 310a and 310b of third and fourth LED assemblies 300a and 300b are all arranged at the same distance d3. Accordingly, a light diffusion distance for the third LED package 310a is less than the first width w1 of the corresponding non-display region NA1 while a light diffusion distance for the fourth LED package 310b is greater than the second width w2 of the corresponding non-display region NA2. Accordingly, as shown in FIG. 7, a non-overlap region caused by the fourth LED package 310b exists even in the display region AA although a non-overlap region by the third LED package 310a does not exist in the display region AA. Therefore, hot spots are seen by a viewer.

Further, when the LED packages 310a and 310b are arranged considering the first width w1 greater than the second width w2, the LED packages 310a and 310b are used greater than required, and production cost is more than the embodiment.

The embodiment described above is explained with the first and second LED assemblies located at the sides of the first and second non-display regions. Alternatively, the first and second LED assemblies may be located at the sides of other non-display regions i.e., a third non-display region, which a gate PCB is connected to or a gate driving IC is mounted on, and a fourth non-display region opposite to the third non-display region. Further, four LED assemblies may be located at the sides of four non-display regions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a liquid crystal panel including a display region and first to fourth non-display regions surrounding the display region, the display region being an area where images are to be displayed, and the first to fourth non-display regions being areas outside the display region;
a light guide plate below the liquid crystal panel; and
a first LED assembly facing a side of the light guide plate and at a side of the first non-display region and a second LED assembly facing an opposite side of the light guide plate and at a side of the second non-display region,
wherein the first non-display region has a first width, and the second non-display region has a second width, wherein the first LED assembly includes a plurality of first LED packages arranged at a first distance, and the second LED assembly includes a plurality of second LED packages arranged at a second distance, and
wherein the first width is greater than the second width, and the first distance is greater than the second distance.

2. The device according to claim 1, further comprising:
at least one optical sheet between the liquid crystal panel and the light guide plate;
a reflecting sheet below the light guide plate;
a main supporter surrounding sides of the liquid crystal panel;
a bottom case below the reflecting sheet; and
a top case surrounding the sides and top peripheral portions of the liquid crystal panel.

3. The device according to claim 1, wherein a gate driving IC or a data driving IC is mounted on the first non-display region, or a driving PCB is connected to the first non-display region.

4. The device according to claim 3, wherein the first LED packages are arranged to meet an expression, $d1 \leq 2*w1$, and the second LED packages are arranged to meet an expression, $d2 \leq 2*w2$, where d1, d2, w1 and w2 are the first and second distances, and the first and second widths, respectively.

5. The device according to claim 4, wherein the first LED packages are arranged to meet an expression, $d1 > w3$, and the second LED packages are arranged to meet an expression, $d2 > w4$, where w3 and w4 are widths of the first and second LED packages, respectively, along an arrangement direction thereof.

6. The device according to claim 5, wherein a number of the first LED packages is less than that of the second LED packages.

7. The device according to claim 1, wherein a width of a first area where light from a first LED package does not overlap with light from an adjacent first LED package is less than the first width, a width of a second area where light from a second LED package does not overlap with light from an adjacent second LED package is less than the second width, and the width of the first area is greater than the width of the second area.

* * * * *